United States Patent
Tezuka et al.

(10) Patent No.: US 9,454,144 B2
(45) Date of Patent: Sep. 27, 2016

(54) MACHINE TOOL PATH DISPLAY APPARATUS DISPLAYING RELATIVE TOOL VECTOR ANGLE

(71) Applicant: FANUC CORPORATION, Yamanashi (JP)

(72) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 537 days.

(21) Appl. No.: 13/860,084

(22) Filed: Apr. 10, 2013

(65) Prior Publication Data

US 2013/0338816 A1    Dec. 19, 2013

(30) Foreign Application Priority Data

Jun. 14, 2012 (JP) .................................. 2012-134661

(51) Int. Cl.
*G05B 19/18* (2006.01)
*G05B 19/409* (2006.01)

(52) U.S. Cl.
CPC ........... *G05B 19/182* (2013.01); *G05B 19/409* (2013.01); *G05B 2219/35349* (2013.01)

(58) Field of Classification Search
None
See application file for complete search history.

(56) References Cited

U.S. PATENT DOCUMENTS

| 8,018,192 B2 | 9/2011 | Iwashita et al. | |
| 2006/0229761 A1* | 10/2006 | Kita | G05B 19/4068 700/181 |
| 2007/0156278 A1* | 7/2007 | Hiraga | G05B 19/406 700/184 |
| 2011/0046773 A1* | 2/2011 | Iwashita | G05B 19/4097 700/182 |
| 2012/0283862 A1* | 11/2012 | Nonaka | G05B 19/4069 700/97 |

FOREIGN PATENT DOCUMENTS

| JP | 2011-043874 A | 3/2011 |
| JP | 2011-192017 A | 9/2011 |

OTHER PUBLICATIONS

English translation of Fujita et al. Japanese Patent No. 402257308A.*

* cited by examiner

*Primary Examiner* — Mohammad Ali
*Assistant Examiner* — Bernard G Lindsay
(74) *Attorney, Agent, or Firm* — Hauptman Ham, LLP

(57) ABSTRACT

A tool path display apparatus includes a display unit for displaying at least two of a program path, a command path and an actual path so that the paths can be compared with each other. The tool path display apparatus further includes a tool vector display unit for displaying tool vectors representative of tool postures corresponding to these paths so that the tool vectors can be compared with each other. Each tool vector is displayed as a line segment connecting a tool tip point and a reference point distant from the tool tip point toward a tool base end side by a predetermined distance.

3 Claims, 10 Drawing Sheets

MACHINE TOOL PATH DISPLAY APPARATUS DISPLAYING RELATIVE TOOL VECTOR ANGLE

RELATED APPLICATIONS

The present application is based on, and claims priority from, Japanese Application Number 2012-134661, filed Jun. 14, 2012, the disclosure of which is hereby incorporated by reference herein in its entirety.

BACKGROUND OF THE INVENTION

1. Technical Field

The present invention relates to a tool path display apparatus that displays a tool vector of a machine tool.

2. Description of Related Arts

Some numerical control apparatuses for controlling a machine tool are used together with a tool path display apparatus that displays a tool path along which a tool moves. An operator uses visual information on a tool path displayed by the tool path display apparatus, in order to evaluate a machining process. For evaluation of a machining process, it is advantageous to evaluate a tool vector representative of a posture of a tool, in addition to a path representative of a moving path of a tool tip point corresponding to a portion for machining. FIGS. 11A and 11B are schematic views illustrating an effect of a tool posture on a shape formed by machining. FIG. 11A shows a machined shape obtained when a tool 100 has a posture substantially perpendicular to a machined surface P. On the other hand, FIG. 11B shows a machined shape obtained when the tool 100 has a posture inclined to the machined surface P. As can be clearly seen in comparison of FIG. 11A and FIG. 11B, even though a tool tip point 102 is positioned at the same point, a shape of the machined surface P can be completely different, depending on the tool posture.

Japanese Patent No. 4689745 discloses a tool vector display apparatus that displays an actual path obtained from actual position information of a tool tip point detected by a detection device and also a posture of a tool as a tool vector on the actual path. This related art is designed to display a tool vector together with an actual path so as to allow a tool posture to be visually inspected in a portion where an error possibly occurs in a machined shape.

However, it has been found difficult to identify the cause of the error in a machined shape only with information displayed by the tool vector display apparatus taught by Japanese Patent No. 4689745. Therefore, there is a need for a tool path display apparatus that provides visual information effective to identify the cause of an error in a machined shape.

SUMMARY OF THE INVENTION

According to a first aspect of the present invention, a tool path display apparatus is provided. The tool path display apparatus comprises a display unit for displaying at least two of a program path, a command path and an actual path such that the paths can be compared with each other, based on information from a numerical control apparatus for controlling a position of a tool tip point of a machine tool, the program path being a path of the tool tip point corresponding to a machining program, the command path being a path of the tool tip point corresponding to a command signal to a drive unit of the machine tool, the actual path being a path of the tool tip point detected by a detection device, wherein the display unit further comprises a tool vector display unit for displaying at least one line segment connecting the tool tip point passing through the program path, the command path or the actual path and a reference point distant from the tool tip point toward a tool base side by a predetermined distance, as a tool vector representative of a tool posture, and wherein the tool vector display unit is adapted to display each of the tool vectors for the at least two of the program path, the command path and the actual path such that the tool vectors can be compared with each other.

According to the first aspect, the tool path display apparatus includes a tool vector display unit that displays tool vectors representing tool postures corresponding to at least two of the program path, the command path and the actual path so that the tool vectors can be compared with each other. Therefore, when an error occurs in a machined shape, an operator can identify the cause of the error by comparing the tool vectors at each machining step displayed as visual information.

According to a second aspect of the present invention, the tool path display apparatus of the first aspect further comprises: a tool vector selecting unit for selecting a tool vector for a first path which is one of the program path, the command path and the actual path and a tool vector for a second path different from the first path; and an angle calculating unit for calculating an angle defined by the tool vector for the first path and the tool vector for the second path, wherein the display unit further comprises an angle display unit for displaying the angle.

According to the second aspect, the tool path display apparatus includes the angle display unit that displays an angle defined between a tool vector selected from the program path, the command path and the actual path and a tool vector corresponding to another path. Therefore, an operator can quantitatively determine how much tool vectors passing through two selected paths are inclined to each other.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will now be described with reference to the accompanying drawings. The scale of each illustrated element of the embodiments may be changed from the practical application for better understanding of the present invention.

Figure 1:
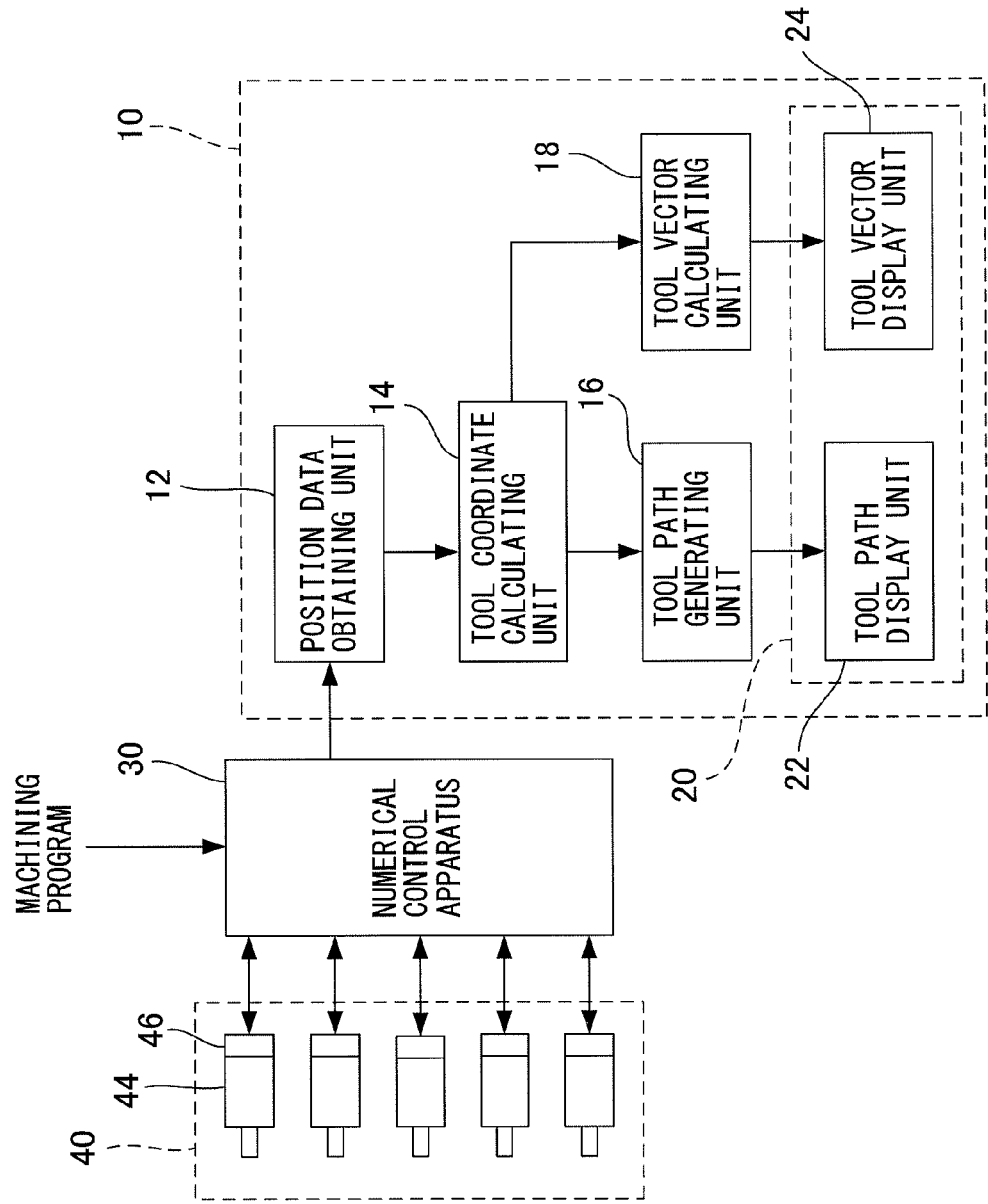
FIG. 1 is a block diagram illustrating a tool path display apparatus according to a first embodiment.

FIG. 1 is a block diagram illustrating a tool path display apparatus 10 according to the first embodiment. The tool path display apparatus 10 includes a position data obtaining unit 12 for obtaining position data of each drive shaft of a machine tool 40 from a numerical control apparatus 30, a tool coordinate calculating unit 14 for calculating a coordinates of a tool tip point 42a based on the position date output from the position data obtaining unit 12, a tool path generating unit 16 for generating a path through which the tool tip point 42a passes, and a display unit 20 having a tool path display unit 22 for displaying the path generated by the tool path generating unit 16 on a monitor screen (not illustrated). The tool path display apparatus 10 also includes a tool vector calculating unit 18 for calculating a tool vector which terminates at the coordinate of the tool tip point 42a. The display unit 20 further includes a tool vector display unit 24 for displaying the tool vector calculated by the tool vector calculating unit 18 on a monitor screen.

The numerical control apparatus 30 sends out a control signal to a motor 44 in accordance with a machining program and various predetermined parameters. Movement of the motor 44 is controlled by the numerical control apparatus 30 to provide power to the drive shafts of the machine tool 40 such as a lathe and a machining center. The numerical control apparatus 30 receives a position feedback of the motor 44 from a detection device 46, such as an encoder, of the motor 44 in order to obtain an actual position of each drive shaft of the machine tool 40.

Figure 2:
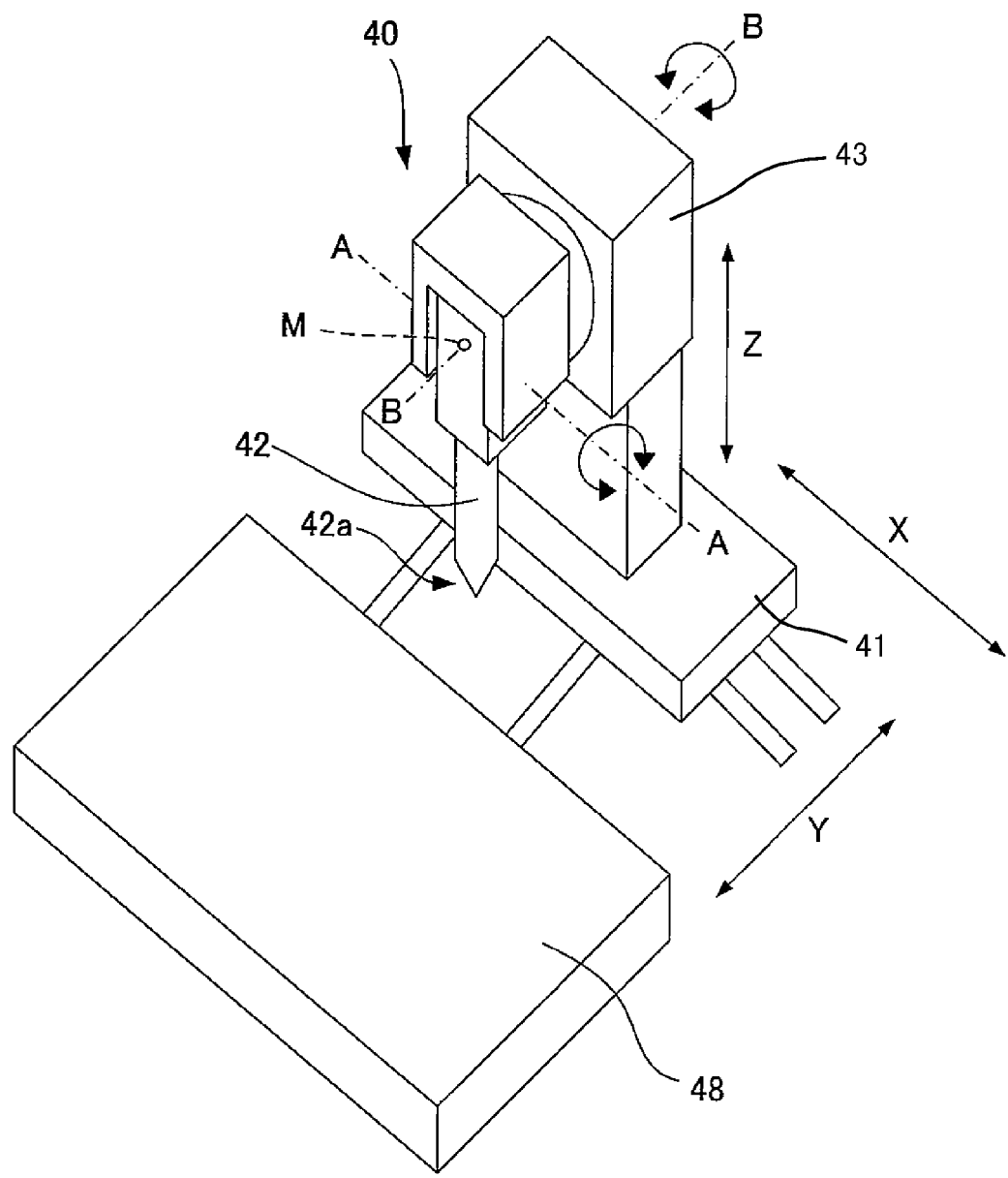
FIG. 2 is a schematic perspective view illustrating an exemplary configuration of a machine tool.

FIG. 2 is a schematic perspective view illustrating a configuration of a 5-axis machine tool by way of example of the machine tool 40. The machine tool 40 includes a first support 41 movable in an X-axis direction and a Y-axis direction, a second support 43 movable in a Z-axis direction, and a tool 42 having a tool tip point 42a. The tool tip point 42a is provided with various types of blades to perform a predetermined machining process such as cutting, grinding, turning or the like for a workpiece (not illustrated) on a table 48. It should be noted that although a "tool tip point" is used in the present specification, the tool tip point 42a does not necessarily refer to a tip of the tool 42, but may also include a portion actually capable of performing a machining process.

Two way arrows illustrated in FIG. 2 show that the tool tip point 42a can move in directions of the respective arrows. In other words, the tool 42 can move independently and parallel to an X-axis, a Y-axis and a Z-axis, respectively. In addition, the tool 42 can rotate around a rotational axis A and a rotational axis B extending perpendicularly to each other, as illustrated by dashed-and-dotted lines, respectively. In this way, the tool tip point 42a can be moved relative to a workpiece in accordance with movement of five drive shafts, each of which can be independently controlled. It should be noted that the 5-axis machine tool 40 is described by way of example the present specification, but it goes without saying that the present invention is applicable in the same manner to a machine tool having other configurations.

A machining program read out by the numerical control apparatus 30 contains various information such as a command position and command velocity of each drive shaft, which is defined in a predetermined format such as a G code and generated with the aid of software such as CAD/CAM, based on a shape of a machined article. The machining program also contains information such as shape data used to generate a path by connecting coordinate points, as further described below. Operations of the numerical control apparatus 30, such as a process for generating a control signal of the motor 44 in accordance with a machining program and parameters are well known, and therefore a detailed description thereof will be omitted in the present specification.

Referring back to FIG. 1, the position data obtaining unit 12 obtains position data from the numerical control apparatus 30. The position data contains a program position, a command position and an actual position. The program position is a command position specified by a machining program for each drive shaft. The command position is a command position for each drive shaft obtained based on the result of interpolation by the numerical control apparatus 30. The numerical control apparatus 30 performs interpolation, based on a program path generated according to a method described below, on a command velocity specified by a machining program, and on an acceleration/deceleration time constant specified by parameters. As a result of the interpolation, a command position of each drive shaft for each control cycle is calculated.

The actual position is a position of each motor 44 detected by the detection device 46 of the motor 44, or in other words, an actual position of each drive shaft. Alternatively, an actual position of each drive shaft may also be calculated by multiplying an integrated value obtained by integrating position feedbacks from the numerical control apparatus 30 with a moving amount per unit pulse.

The tool coordinate calculating unit 14 calculates a coordinates of the tool tip point 42a based on the position data obtained by the position data obtaining unit 12 and machine configuration information. The machine configuration information refers to information representative of a position of the tool tip point 42a relative to the machine tool 40. The tool coordinate calculating unit 14 calculates a program coordinate which is a coordinates of the tool tip point 42a corresponding to the machining program, based on the program position and the machine configuration information. The tool coordinate calculating unit 14 also calculates a command coordinate which is a coordinates of the tool tip point 42a corresponding to a command position after the interpolation by the numerical control apparatus 30, based on the command position and the machine configuration information. In addition, the tool coordinate calculating unit 14 calculates an actual coordinate corresponding to a coordinate of the tool tip point 42a detected by the detection device 46, based on the actual position and the machine configuration information.

The tool path generating unit 16 generates a path of the tool tip point 42a by connecting, with a predetermined shape, the coordinates of the tool tip point 42a calculated by the tool coordinate calculating unit 14 for each predetermined cycle. The tool path generating unit 16 generates a program path by connecting the program coordinates calculated by the tool coordinate calculating unit 14 with shape data specified by the machining program, such as straight lines and arcs. Further, the tool path generating unit 16 generates a command path by connecting the command coordinates calculated by the tool coordinate calculating unit 14 with straight lines, for example. The tool path generating unit 16 also generates an actual path by connecting the actual coordinates calculated by the tool coordinate calculating unit 14 with straight lines, for example.

Figure 3:
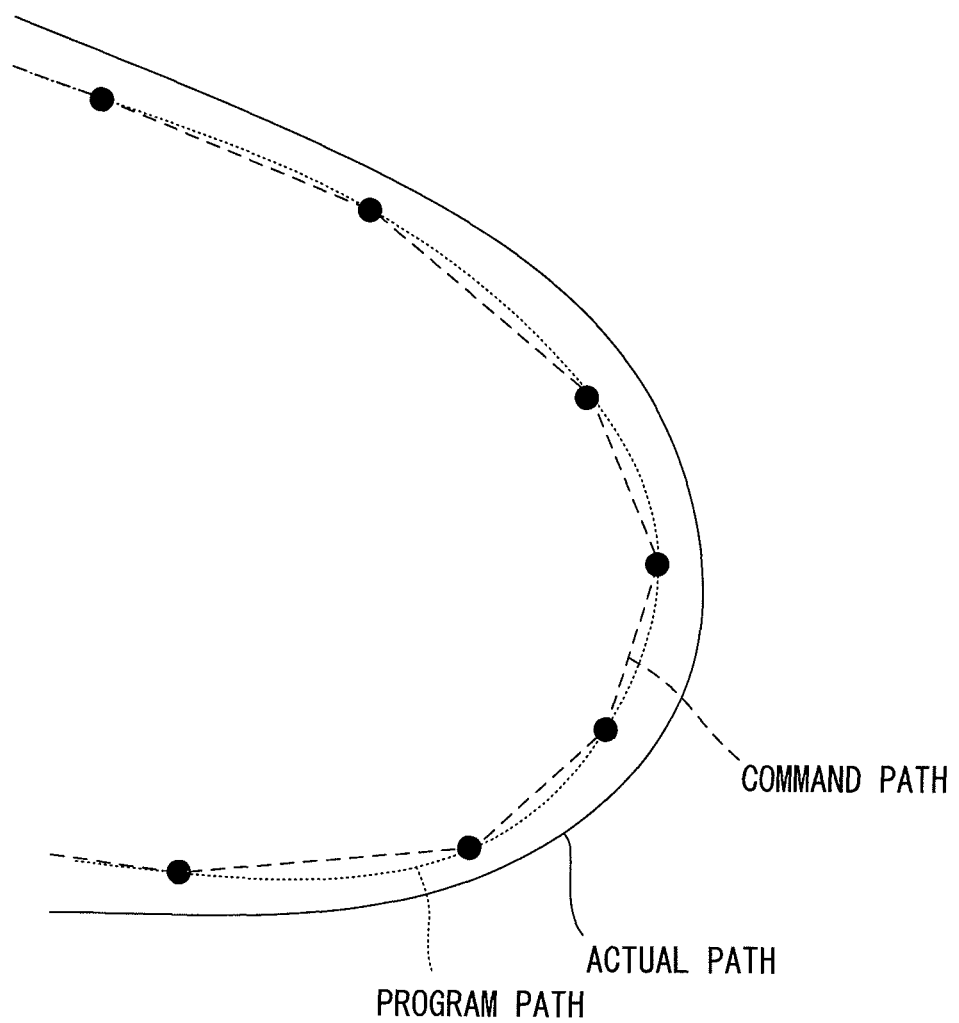
FIG. 3 is an exemplary display in which a program path, a command path and an actual path are shown in a way that the paths can be compared with each other.

The program path, the command path and the actual path generated by the tool path generating unit 16 are displayed on a monitor screen by the tool path display unit 22. FIG. 3 shows an exemplary display in which the program path, the command path and the actual path are displayed in an overlapped manner so that the paths can be compared with one another. In FIG. 3, the dotted line represents the program path, the dashed line represents the command path, and the solid line represent the actual path. The black dots of FIG. 3 represent command coordinates. By displaying the respective paths in an overlapped manner so that they can be compared with one another as described above, it can be determined whether or not the tool tip point 42$a$ actually moves in accordance with the program path, for example. In addition, if it has been found that the tool tip point 42$a$ does not move as intended, an operator can identify the cause of errors among the machining program, the command creating process and the servo control by the numerical control apparatus 30, based on visual information by comparing the respective paths.

Referring back to FIG. 1, the tool path display apparatus 10 includes the tool vector calculating unit 18. The tool vector calculating unit 18 is configured to receive the program coordinates, the command coordinates and the actual coordinates calculated by the tool coordinate calculating unit 14. The tool vector calculating unit 18 calculates a tool vector representative of a tool posture from these coordinates.

A process for calculating the tool vector will be described below with the exemplary 5-axis machine tool of FIG. 2. The coordinates of the X-axis, Y-axis, Z-axis, A-axis and B-axis at time t are designated as x(t), y(t), z(t), a(t), and b(t), respectively. In a coordinate system fixed to a workpiece, an origin is set so that the coordinate of the intersection M of the rotational axis A and the rotational axis B can be designated as (x(t), y(t), z(t)). When a distance between the intersection M and the tool tip point 42$a$ is designated as L and a position where the tool 42 is oriented downward in the vertical direction is set to the origins of the A-axis and B-axis, coordinate Pos X in the X-axis, coordinate Pos Y in the Y-axis, and coordinate Pos Z in the Z-axis of the tool tip point 42$a$ can be calculated by the following equations, respectively:

$$Pos\ X = x(t) + L \times \cos(a(t)) \times \sin(b(t));$$

$$Pos\ Y = y(t) + L \times \sin(a(t));\ and$$

$$Pos\ Z = z(t) - L \times \cos(a(t)) \times \cos(b(t)),$$

where, a point specified by the coordinates of the tool tip point 42$a$ expressed by the above equations is designated as the vector end point Pe.

On the other hand, the vector starting point Ps refers to a reference point set in a position distant by a predetermined distance d from the vector end point Pe, i.e., the tool tip point 42$a$, toward the base end of the tool 42 along the central axis line of the tool 42. Coordinate Pos X' in the X-axis, coordinate Pos Y' in the Y-axis, and coordinate Pos Z' in the Z-axis of the vector starting point Ps can be calculated by the following equations, respectively:

$$Pos\ X' = x(t) + (L-d) \times \cos(a(t)) \times \sin(b(t));$$

$$Pos\ Y' = y(t) + (L-d) \times \sin(a(t));\ and$$

$$Pos\ Z' = z(t) - (L-d) \times \cos(a(t)) \times \cos(b(t)).$$

Figure 4:
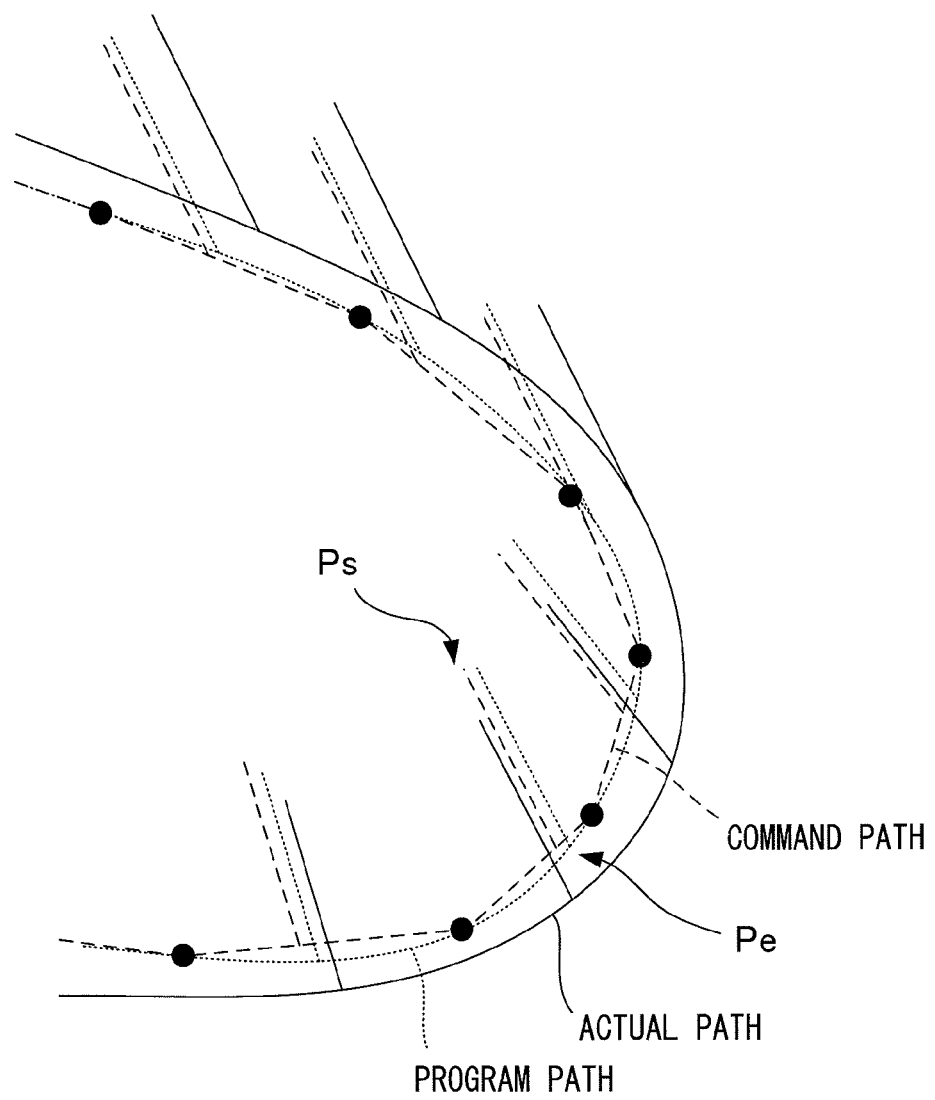
FIG. 4 is an exemplary display in which a plurality of tool vectors for each path of FIG. 3 are additionally shown.

The tool vector display unit 24 displays the tool vector calculated by the tool vector calculating unit 18 on a monitor screen. The tool vector is displayed as a line segment connecting the vector starting point Ps and the vector end point Pe calculated by the tool vector calculating unit 18 as described above. FIG. 4 shows an exemplary display in which a plurality of tool vectors are additionally shown for the program path, the command path, and the actual path, respectively, as illustrated in FIG. 3. The tool vector of each path linearly extends from the vector starting point Ps to the vector end point Pe on each path. The tool vectors passing through each path are also displayed in an overlapped manner so that the tool vectors can be compared with one another in the same manner as the respective paths. In order to distinguish the tool vectors from one another, in the same manner as the paths, a dotted line corresponds to a tool vector on the program path, a dashed line corresponds to a tool vector on the command path and a solid line corresponds to a tool vector on the actual path, respectively. As such, the tool vectors passing through the respective paths are displayed in an overlapped manner so that they can be compared with one another in addition to the paths, and therefore, when an error occurs in a machined shape, for example, the cause of the error can be identified based on visual information.

When the machined shape is not obtained as intended, several causes are considered. One of the possible causes is that the machining program is incorrect. In this case, since a machining process is performed in accordance with incorrect instructions of the machining program, an intended machined shape is not obtained, of course. Another possible cause of the error in the machined shape is related to a process for creating commands by the numerical control apparatus 30. In this case, adjustment is necessary to allow appropriate commands to be created by correcting parameter settings or the like. In addition, if the servo control has been inappropriately adjusted, for example, a servo delay may occur.

Figure 5:
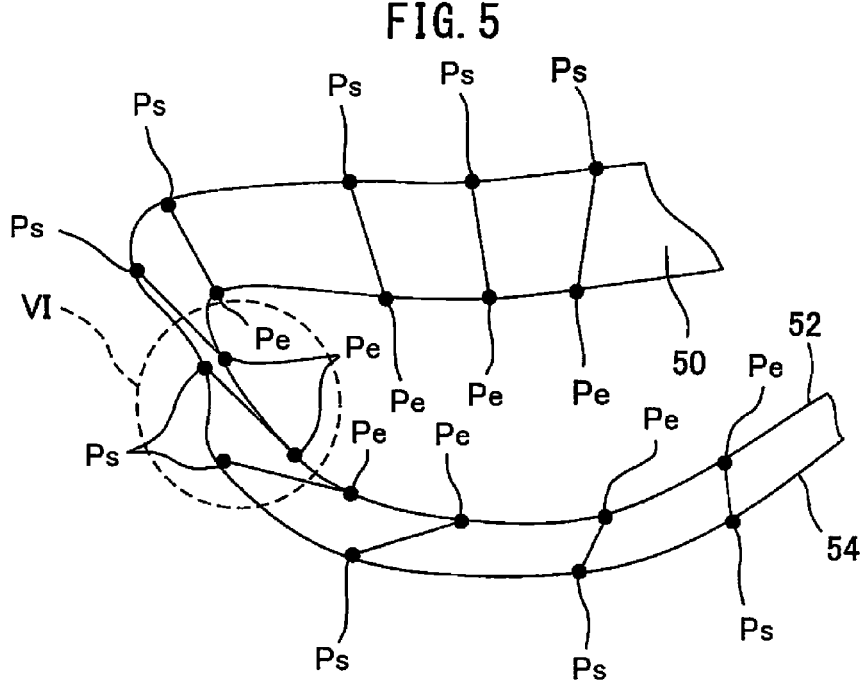
FIG. 5 is a schematic view illustrating tool vectors together with a machined surface.
Figure 6:
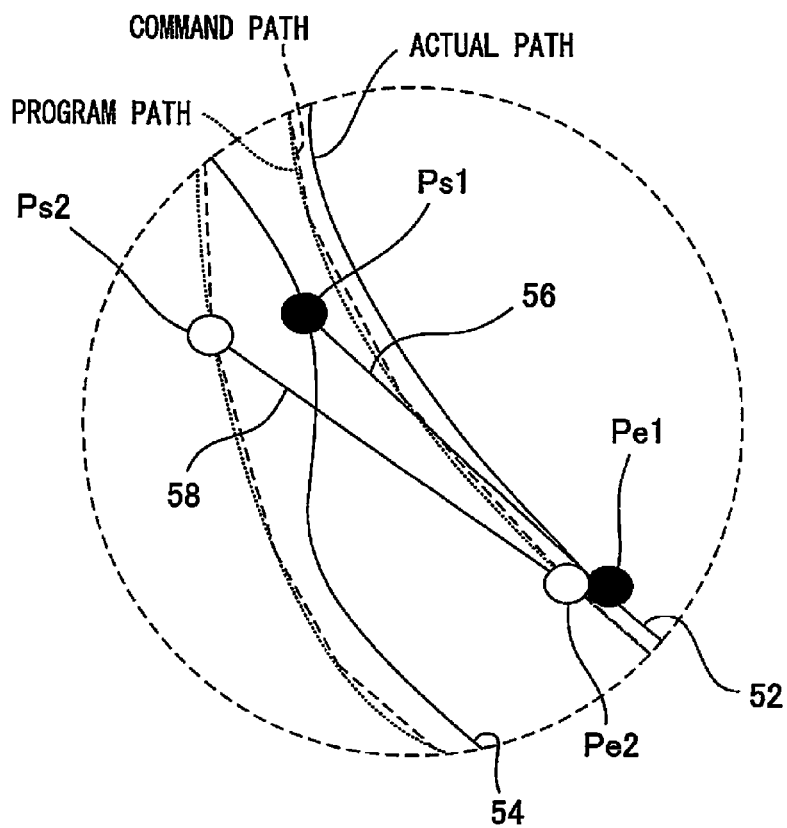
FIG. 6 is a partially enlarged view illustrating a region VI of FIG. 5.

With reference to FIG. 5 and FIG. 6, exemplary evaluation of the tool posture based on comparison of the tool vectors will be described below. FIG. 5 is a schematic view illustrating the tool vectors together with a machined surface 50. FIG. 6 is a partially enlarged view illustrating the region VI of FIG. 5. In this example, the machined surface 50 is not obtained smoothly in the region VI of FIG. 5, so that the machined surface 50 has an irregular concave-convex shape. In FIG. 5, a curve 52 representative of the contour of the machined surface 50 is an actual path, or in other words, a path of the tool tip point 42$a$ (the end point Pe of a tool vector). A curve 54, on the other hand, is a path of the starting point Ps of the tool vector which is displaced depending on movement of the tool 42.

Referring to FIG. 6, a tool vector 56 having a starting point Ps1 and an end point Pe1 for the actual path and a tool vector 58 having a starting point Ps2 and an end point Pe2 for the command path are displayed so that the tool vectors can be compared with each other. A tool vector for the program path is omitted for simplification, since it can be represented by almost the same line segment as the tool vector 58 for the command path. In other words, the tool vector for the program path and the tool vector 58 for the command path substantially match with each other, but in contrast, only the tool vector 56 for the actual path is displayed as the line segment remarkably differing from the other tool vectors 58. In such a case, it can be assumed that the tool 42 is not moved in accordance with a command sent out from the numerical control apparatus 30. Therefore, it can be determined that an error occurs in the machined surface 50 due to an inappropriate adjustment of the servo control or disturbance during the machining process.

In another example where, for example, a tool vector for the command path and a tool vector for the actual path substantially match with each other, and only a tool vector for the program path remarkably differs from the other tool vectors, it can be assumed that an error in the machined shape occurs due to a process for creating a command from the machining program, such as an interpolation process. Accordingly, with the tool vectors for the respective paths displayed in a way that the tool vectors can be compared with one another, when the tool 42 has been found to have an undesired posture, an operator can identify the cause of the error, based on visual information.

Figure 7:
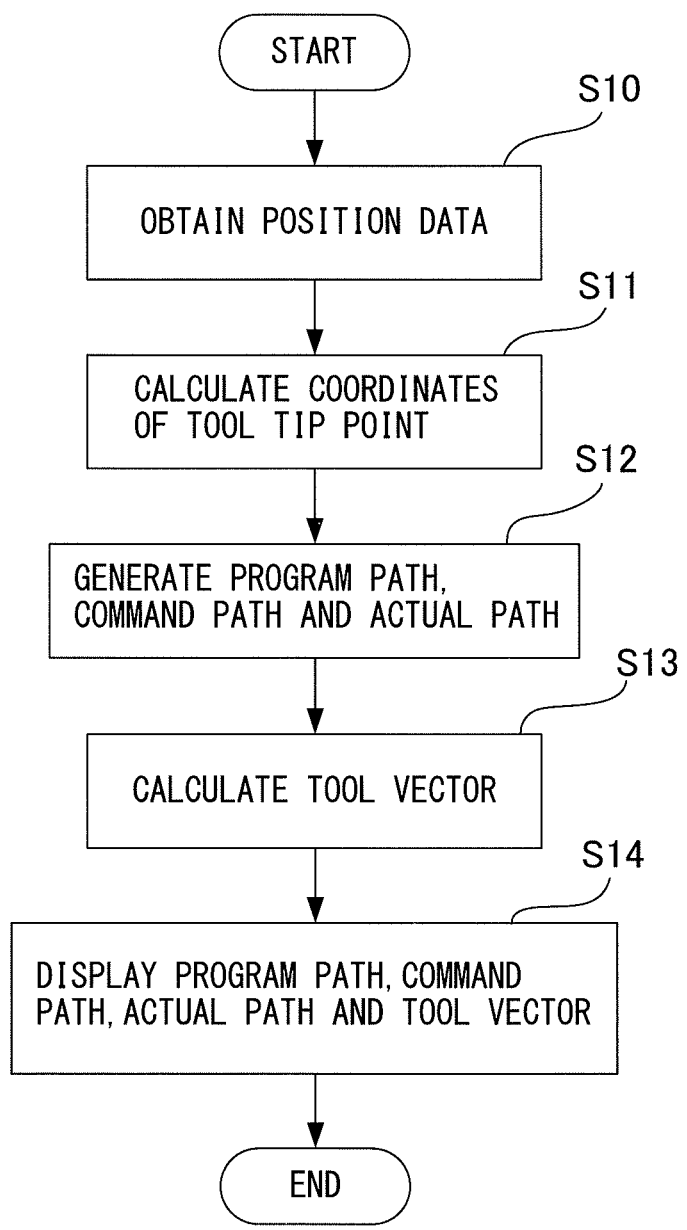
FIG. 7 is a flowchart illustrating steps of a display process by the tool path display apparatus according to the first embodiment.

FIG. 7 is a flowchart illustrating steps of a display process by the tool path display apparatus 10 according to the first embodiment. First, the tool path display apparatus 10 activates the position data obtaining unit 12 to obtain position data from the numerical control apparatus 30 (step S10). The position data contains a program position, a command position and an actual position as described above. The tool path display apparatus 10 then activates the tool coordinate calculating unit 14 to calculate program a coordinate, a command coordinate, and an actual coordinate representative of the coordinate of the tool tip point 42a, based on the position data sent out from the position data obtaining unit 12 and mechanical configuration information (step S11). The tool path display apparatus 10 then activates the tool path generating unit 16 to generate a program path, a command path and an actual path by connecting the program coordinates, the command coordinates and the actual coordinates calculated by the tool coordinate calculating unit 14 with a predetermined shape, respectively (step S12).

Subsequently, the tool path display apparatus 10 activates the tool vector calculating unit 18 to calculate a tool vector (step S13). As described above, the tool vector is a line segment connecting the tool tip point 42a and a reference point distant from the tool tip point 42a toward the base end of the tool 42 by a predetermined distance. The starting point and the end point of the tool vector are each calculated for the program coordinates, the command coordinates and the actual coordinates. The tool path display apparatus 10 then activates the tool path display unit 22 and the tool vector display unit 24 to display the program path, the command path and the actual path as well as the tool vectors for the respective paths on the monitor screen (step S14).

Next, other embodiments of the present invention different from the above-described embodiment will now be described. In the following description, matters that have already been described will be omitted if necessary. Further, the same or corresponding elements will be designated with the same referential numerals.

Figure 8:
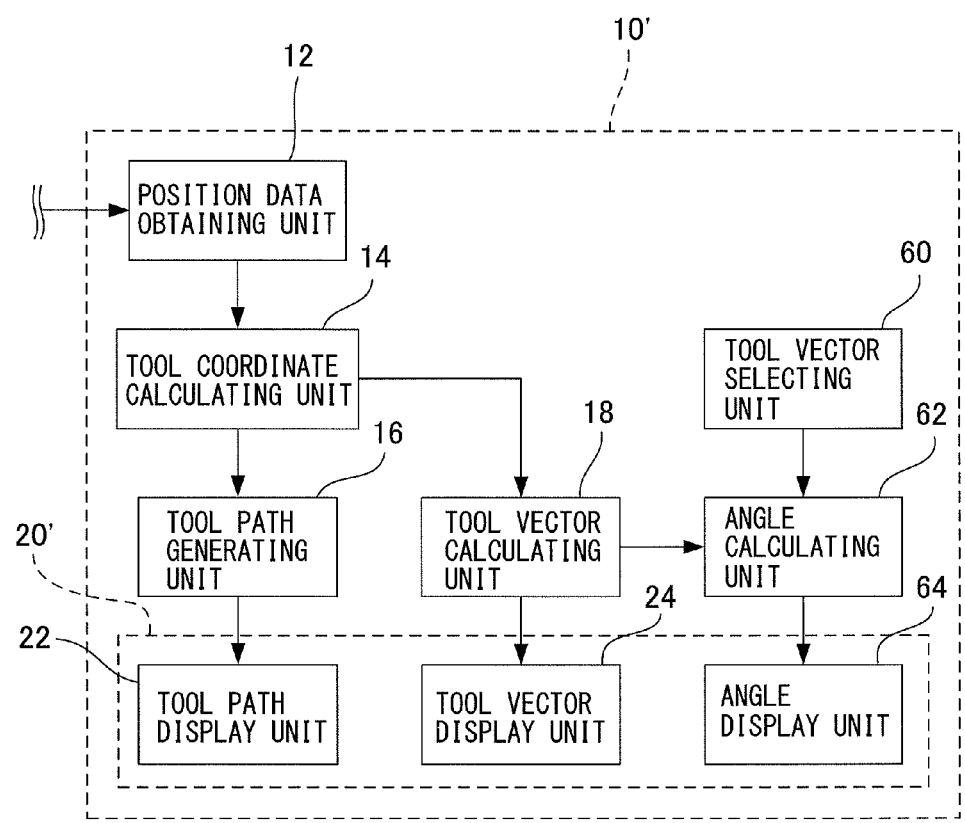
FIG. 8 is a block diagram illustrating a tool path display apparatus according to a second embodiment.

FIG. 8 is a block diagram illustrating a tool path display apparatus 10' according to the second embodiment. FIG. 8 illustrates only the tool path display apparatus 10'. As can be seen from comparison with FIG. 1, illustration of the numerical control apparatus 30 and the machine tool 40 is omitted in FIG. 8. However, the interaction of the tool path display apparatus 10' with the numerical control apparatus 30 and the machine tool 40 is the same as in the case of the tool path display apparatus 10 according to the first embodiment as described above.

The tool path display apparatus 10' in the present embodiment includes a tool vector selecting unit 60, an angle calculating unit 62 and an angle display unit 64, in addition to the configuration of the tool path display apparatus 10 of the first embodiment.

The tool vector selecting unit 60 selects two tool vectors for any given coordinates selected by an operator by means of an external input device such as a mouse or a keyboard. For this process, it is also selected which paths of the program path, the command path and the actual path correspond to these tool vectors. Of the two selected tool vectors, one of the tool vectors is selected for a path different from a path for the other tool vector. For example, an operator selects a position of the tool tip point 42a to be selected and kinds of the paths, or in other words any two of the program path, the command path and the actual path. In response to an operation by the operator, the tool vector selecting unit 60 selects tool vectors for the selected positions and paths and sends out information to identify the selected tool vectors to the angle calculating unit 62.

The angle calculating unit 62 obtains each of the coordinates of vector starting points Ps1 and Ps2 and vector end points Pe1 and Pe2 of the two tool vectors selected by the tool vector selecting unit 60 from the tool vector calculating unit 18 to calculate an angle θ defined by the two tool vectors. The angle θ defined between the two tool vectors is calculated by the following equation based on a formula that is satisfied for a vector inner product:

$$\theta = \cos^{-1}\frac{|(\overrightarrow{Pe1} - \overrightarrow{Ps1}) \cdot (\overrightarrow{Pe2} - \overrightarrow{Ps2})|}{|\overrightarrow{Pe1} - \overrightarrow{Ps1}| \cdot |\overrightarrow{Pe2} - \overrightarrow{Ps2}|}$$

The angle display unit 64 displays the angle θ calculated by the angle calculating unit 62 on a monitor screen, together with the respective paths and tool vectors.

Figure 9:
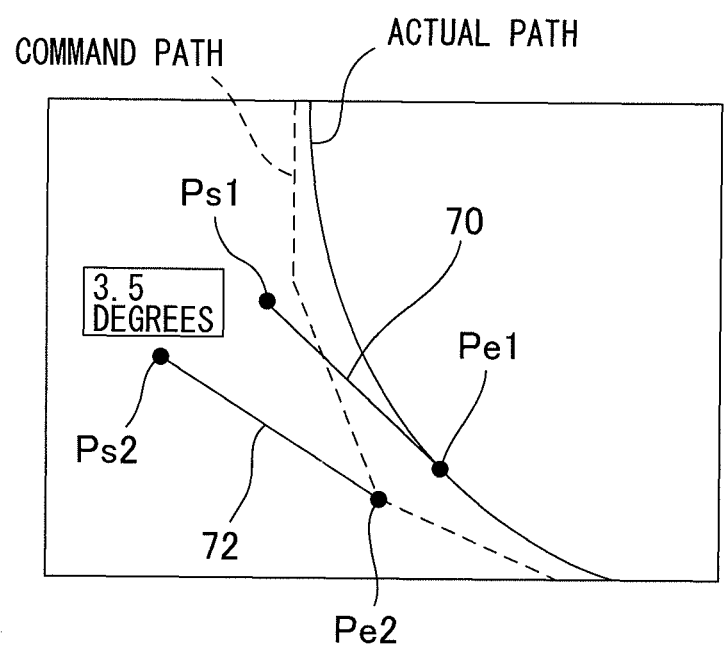
FIG. 9 is a view illustrating an exemplary display in which an angle calculated is additionally shown in accordance with the second embodiment.

FIG. 9 is an exemplary display in which an angle θ calculated according to the second embodiment is additionally shown. By way of example, a tool vector 70 having a starting point Ps1 and an end point Pe1 for the actual path and a tool vector 72 having a starting point Ps2 and an end point Pe2 for the command path are illustrated. The value of the angle θ (3.5 degrees in this example) defined between the tool vectors 70 and 72 is also displayed. Accordingly, with the angle between the tool vectors passing through any selected two different paths displayed on a screen as a numerical value, an operator can quantitatively determine a relative inclined angle of the tool vectors, i.e., of a tool posture.

Figure 10:
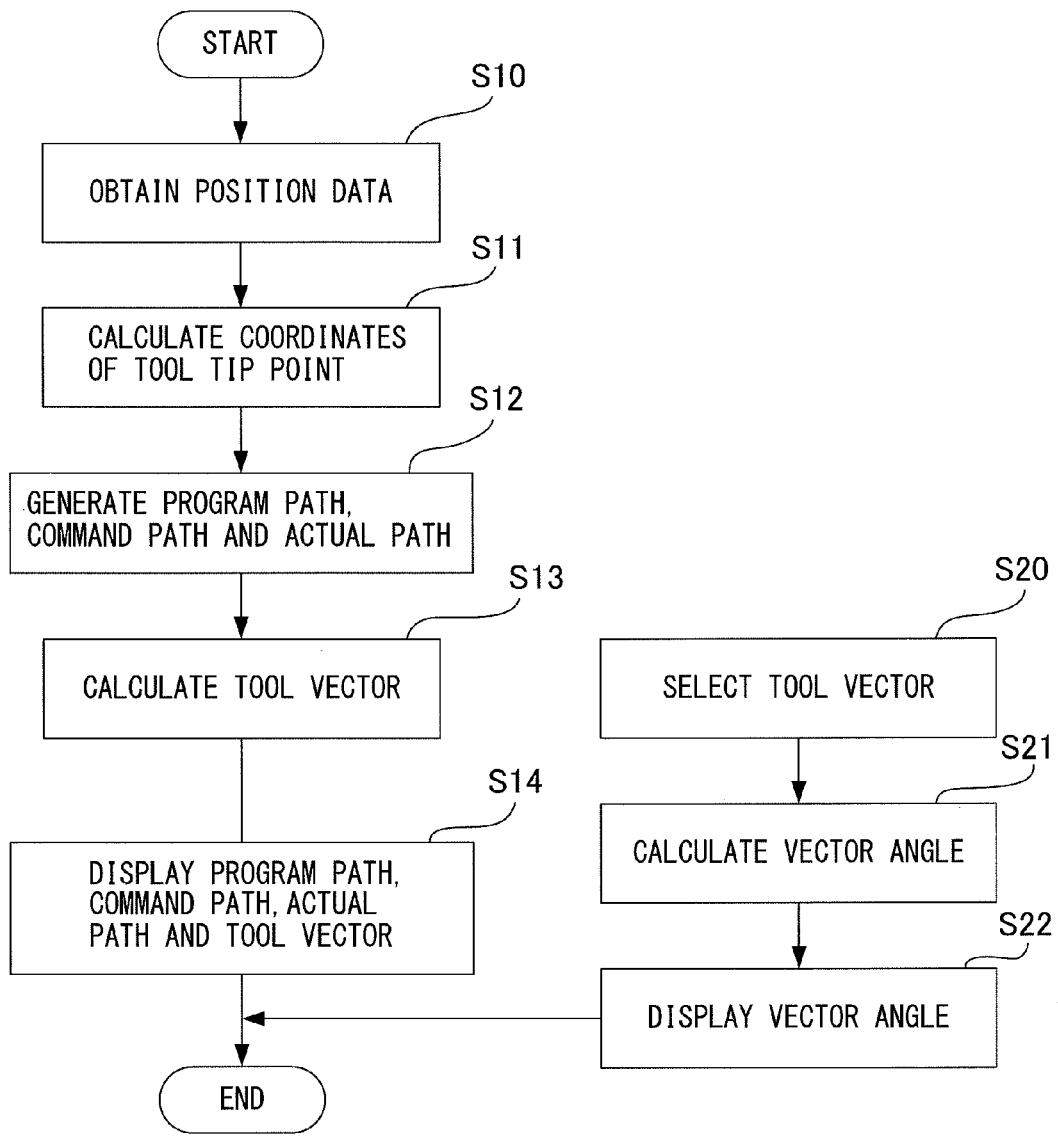
FIG. 10 is a flowchart illustrating steps of a display process by the tool path display apparatus according to the second embodiment.
Figure 11A:
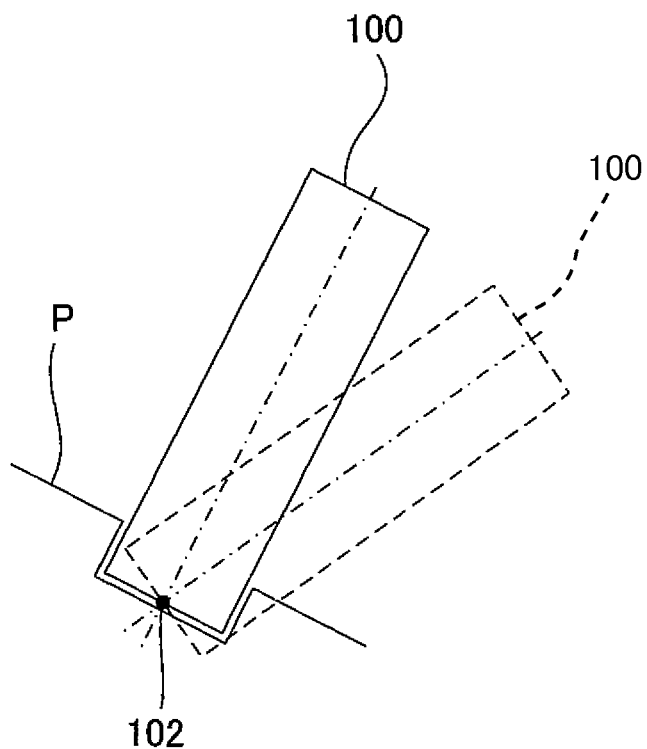
FIG. 11A is a schematic view illustrating an effect by a tool posture on a machined shape.
Figure 11B:
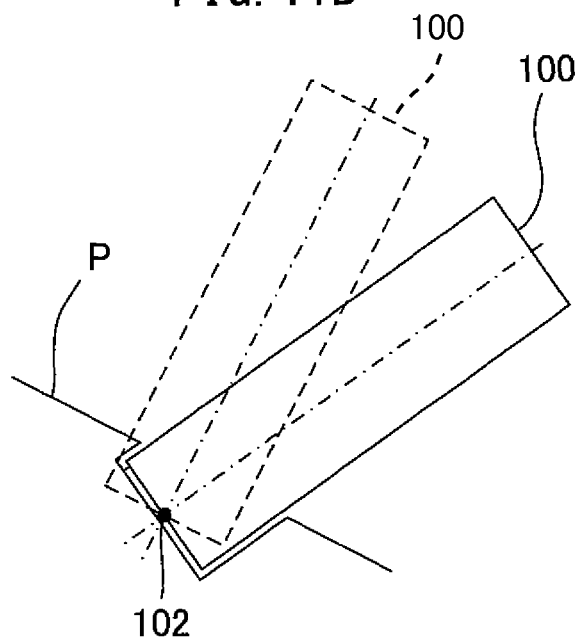
FIG. 11B is a schematic view illustrating an effect by a tool posture on a machined shape.

FIG. 10 is a flowchart illustrating steps of a display process by the tool path display apparatus 10' according to the second embodiment. Processes at steps S10 to S14 are the same as the first embodiment described in relation to FIG. 7, and therefore a further description thereon will be omitted. In the present embodiment, the tool path display apparatus 10' selects any given two tool vectors by the tool vector selecting unit 60 in response to an operation by the operator (step S20). The tool path display apparatus 10' then activates the angle calculating unit 62 to calculate an angle θ defined between the two tool vectors selected at step S20 (step S21). Then, the tool path display apparatus 10' activates the angle display unit 64 to display a value of the angle θ calculated at step S21 on a monitor screen (step S22).

Although various embodiments of the present invention have been described, it is apparent to a person skilled in the art that the present invention can be implemented with any combination of features of the embodiments explicitly or implicitly disclosed in the present specification. In the illustrated embodiments, the exemplary displays in which the respective paths and tool vectors are shown so that they can be compared with one another have been described. However, the present invention is not limited to such particular embodiments. In other words, as long as the respective paths and tool vectors are displayed in a way that they can be compared with one another, the paths and the tool vectors may also be displayed in other ways, for example, in a way that the paths and the tool vectors are displayed side by side on a plurality of screens.

In the illustrated embodiments, the exemplary displays in which three paths, i.e., the program path, the command path and the actual path and the tool vectors corresponding to these paths are shown so that they can be compared with one another have been described. However, only two of the three paths and the tool vectors corresponding thereto may also be displayed so that they can be compared with each other. In particular, any of these paths can be displayed depending on selection by an operator.

EFFECTS OF THE INVENTION

The tool path display apparatus according to the present invention displays tool vectors passing through the program path, the command path and the actual path so that the tool vectors can be compared with one another. Therefore, if an error occurs in a machined shape, an operator can easily identify the cause of the error.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:
1. A tool path display apparatus, comprising:
   a display unit configured to display a program path together with at least one of a command path and an actual path to compare the paths with each other, based on information from a numerical control apparatus for controlling a position of a tool tip point of a machine tool,
   the program path being a path of the tool tip point generated by connecting program coordinates calculated by a tool coordinate calculating unit with shape data specified by a machining program,
   the command path being a path of the tool tip point corresponding to a command signal to a drive unit of the machine tool, and
   the actual path being a path of the tool tip point detected by a detection device,
   wherein the display unit further comprises a tool vector display unit configured to display at least one line segment as a tool vector representative of a tool posture,
   said at least one line segment connecting (a) the tool tip point passing through the program path, the command path or the actual path and (b) a reference point distant from the tool tip point toward a tool base side by a predetermined distance,
   wherein the tool vector display unit is configured to display each of the tool vectors for the at least two of the program path, the command path and the actual path to compare the tool vectors with each other,
   wherein the tool path display apparatus further comprises:
      a tool vector selecting unit configured to select
         a first tool vector for a first path which is one of the program path, the command path and the actual path, and
         a second tool vector for a second path which is one of the program path, the command path and the actual path, and is different from the first path; and
      an angle calculating unit configured to calculate a relative angle defined by the first tool vector and the second tool vector, and
   wherein the display unit further comprises an angle display unit configured to numerically display the relative angle.
2. The tool path display apparatus according to claim 1, wherein the display unit is configured to display all three paths, including the program path, the command path and the actual path, together.
3. The tool path display apparatus according to claim 1, wherein the command path being generated by connecting command coordinates calculated by the tool coordinate calculating unit with straight lines.

* * * * *